(12) United States Patent
Kessleman et al.

(10) Patent No.: US 8,204,028 B2
(45) Date of Patent: Jun. 19, 2012

(54) TECHNIQUES FOR SPATIAL REUSE IN WIRELESS PERSONAL AREA NETWORKS BASED ON VIRTUAL TIME DIVISIONAL MULTIPLE ACCESS

(75) Inventors: Alex Kessleman, San Jose, CA (US); Guoqing Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 12/157,805

(22) Filed: Jun. 12, 2008

(65) Prior Publication Data

US 2009/0310592 A1    Dec. 17, 2009

(51) Int. Cl.
*H04B 7/212* (2006.01)
*H04W 4/00* (2009.01)
(52) U.S. Cl. ........................................ 370/338; 370/347
(58) Field of Classification Search .................. 370/310, 370/328, 334–339, 345, 347
See application file for complete search history.

(56) References Cited

U.S. PATENT DOCUMENTS

| | | | |
|---|---|---|---|
| 2003/0128658 A1* | 7/2003 | Walton et al. | 370/208 |
| 2004/0171402 A1 | 9/2004 | Tamaki et al. | |
| 2006/0022800 A1* | 2/2006 | Krishna et al. | 340/10.2 |
| 2007/0002734 A1* | 1/2007 | Kim et al. | 370/229 |
| 2007/0002803 A1 | 1/2007 | Destino et al. | |
| 2007/0036089 A1 | 2/2007 | Metke et al. | |

OTHER PUBLICATIONS

PCT International Preliminary Report on Patentability corresponding to PCT/US2009/045779, dated Dec. 23, 2010.
PCT Written Opinion corresponding to PCT/US2009/045779, dated Dec. 23, 2010.
International Search Report in related application No. PCT/US2009/045779 mailed Dec. 29, 2009.

* cited by examiner

*Primary Examiner* — Chi Pham
*Assistant Examiner* — Robert Lopata
(74) *Attorney, Agent, or Firm* — Pillsbury Winthrop Shaw Pittman LLP

(57) ABSTRACT

An embodiment of the present invention provides a method, comprising configuring a transceiver for special reuse using a virtual time division multiple access (TDMA) technique in a wireless personal area network that allows additional non-interfering transceivers to perform concurrent transmissions with said transceiver.

15 Claims, 4 Drawing Sheets

TECHNIQUES FOR SPATIAL REUSE IN WIRELESS PERSONAL AREA NETWORKS BASED ON VIRTUAL TIME DIVISIONAL MULTIPLE ACCESS

BACKGROUND

The availability of 7 GHz of unlicensed spectrum in the 60 GHz band offers the potential for multi-Gigabit indoor wireless personal area networking (WPAN). Applications that require large bandwidth include uncompressed High Definition (HD) video streaming, fast file download from an airport kiosk (Sync & Go) and wireless display and docking, to name just a few. These applications cannot be supported over existing home networking solutions (IEEE 802.11a/b/g/n and WiMedia UWB) because the required data rates far exceed the capabilities of these networks.

A mmwave communication link is less robust than those at lower frequencies (e.g. 2.4 GHz and 5 GHz bands) because of its inherent isolation due to both oxygen absorption, which attenuates the signal over long range, and its short wavelength, which provides high attenuation through obstructions such as walls and ceilings. Thus, one of the biggest challenges for designing a high data rate radio system for the 60 GHz band is the limited link budget resulting from high path loss during radio propagation. On the one hand, it is preferable to employ directional antennas for high-speed point-to-point data transmission. On the other hand, a directional antenna pattern covering a wide range of angles to give omni-directional coverage is usually employed to aid in neighbor discovery and beam-steering decisions. A lower band channel (e.g. IEEE 802.11 WLAN in 2.4 GHz or 5 GHz bands or WiMedia UWB in 6 GHz band) may be used as an out-of-band (OOB) control channel providing robust transmission and coverage.

Spatial reuse is the ability of the network to support concurrent transmissions that depends on the network topology and individual transmission ranges. Devices performing directional transmissions can be separated in space such that certain pairs of devices can communicate simultaneously. However, in a traditional 60 GHz wireless personal area network (WPAN), the channel time is scheduled using Time Division Multiple Access (TDMA) technology that does not support parallel trasmissions. Channel time reservations are usually performed for each super-frame (the basic timing division for TDMA) and communicated in the beacon frame(s) sent on the control channel as seen in FIG. 1 at 100.

Thus, a strong need exists for techniques for spatial reuse in wireless personal area networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device or a handheld PDA device.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Figure 1:
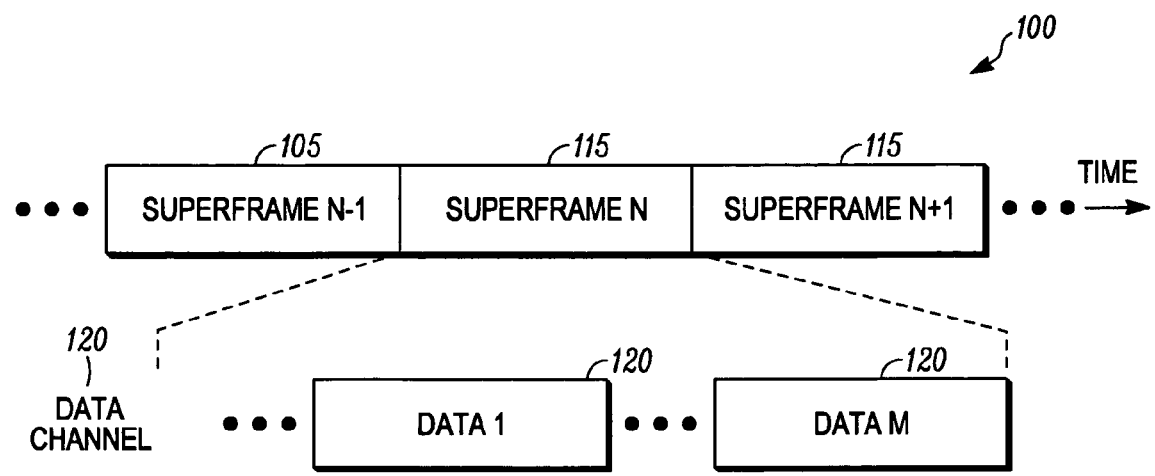
FIG. 1 illustrates an example of a traditional TDMA mechanism.
Figure 2:
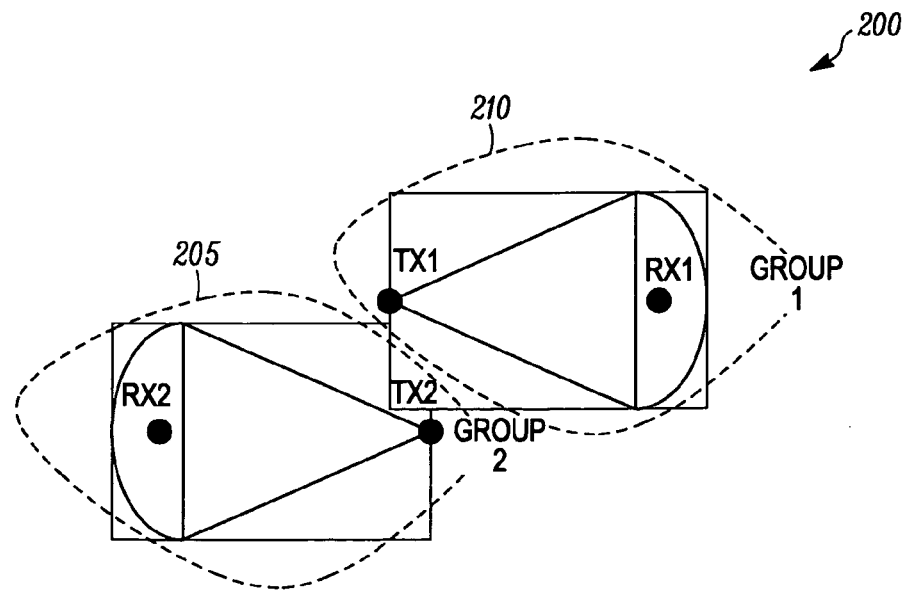
FIG. 2 shows spatial reuse groups division in an embodiment of the present invention.

An embodiment of the present invention provides a virtual time division multiple access (TDMA) scheme that allows non-interfering devices to perform concurrent transmissions. All links (transmitter/receiver [also referred to herein as a transceiver] pairs of devices) may be divided into a number of groups so that a directional transmission of a transmitter in one group does not interfere with a receiver in a different group as shown generally as 200 of FIG. 2. Group 1 is shown at 210 with transmitter (also referred to herein as transceiver) 1 and receiver (also referred to herein as transceiver) 1 and group 2 at 205 with transmitter (transceiver) 2 and receiver (transceiver) 2. The links may be either unidirectional or bidirectional. We denote the number of such groups by k.

Figure 3:
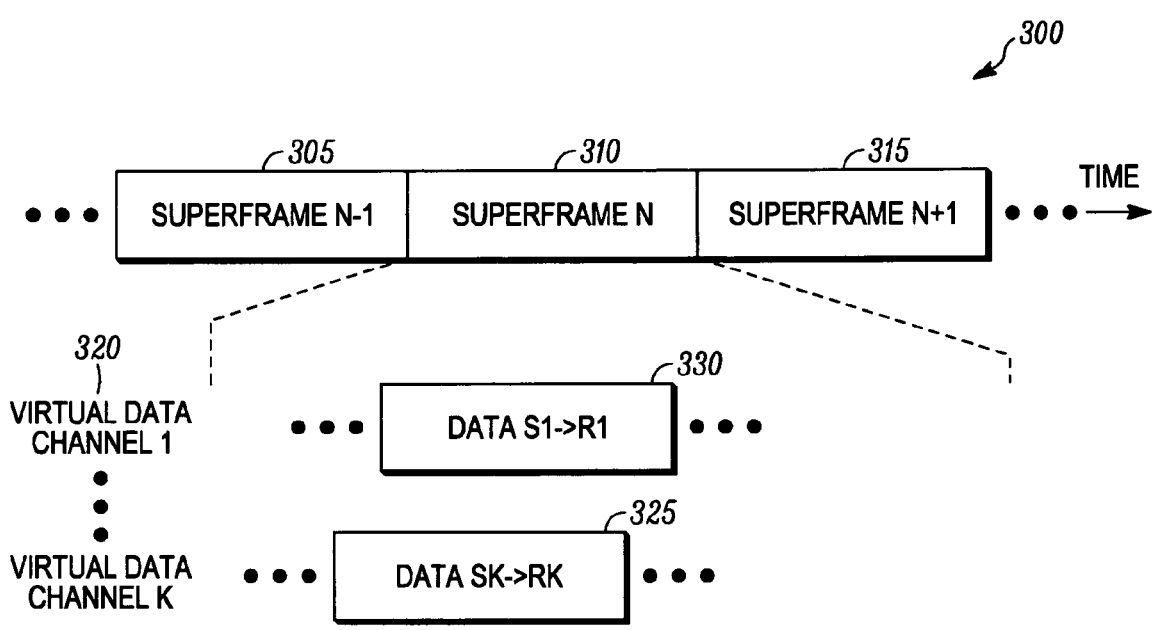
FIG. 3 depicts a proposed virtual TDMA mechanism in an embodiment of the present invention.

In this way, data transmissions may be scheduled independently using TDMA on k virtual channels 320 as seen generally at 300 of FIG. 3. Superframe n−1 is shown at 305, superframe n at 310 and superframe n+1 at 315. Data SI to RI is shown at 330 and data Sk to Rk is shown at 325. Under a centralized MAC (e.g. IEEE 802.15.3c), this subdivision can be performed by the coordinator while under a distributed MAC (e.g. WiMedia UWB) such groups may be defined through negotiation between devices on the control channel. In order to maximize the number of parallel transmissions (that is the number of groups k), transmitting devices may decrease the transmission power and/or change the beam-steering patterns. The scheduling of channel time reservations in different groups needs to be coordinated if a particular device participates in multiple links falling into different groups so that this device is not scheduled in more than one group at a time.

To divide the links into groups, it is necessary to identify the interference level caused by a transmitter (transceiver) at potential victim receivers (transceivers). The Coordinator under a centralized MAC or each device under a distributed MAC constructs a table indicating whether the transmission of a particular device interferes with an existing link. The compatibility table determines which links are able to transmit simultaneously and shall be updated when the beam-steering pattern changes or a devices moves to a new location. This table is used to construct the spatial reuse groups, which allow simultaneous transmissions in the WPAN thus achieving spatial reuse.

Figure 4:
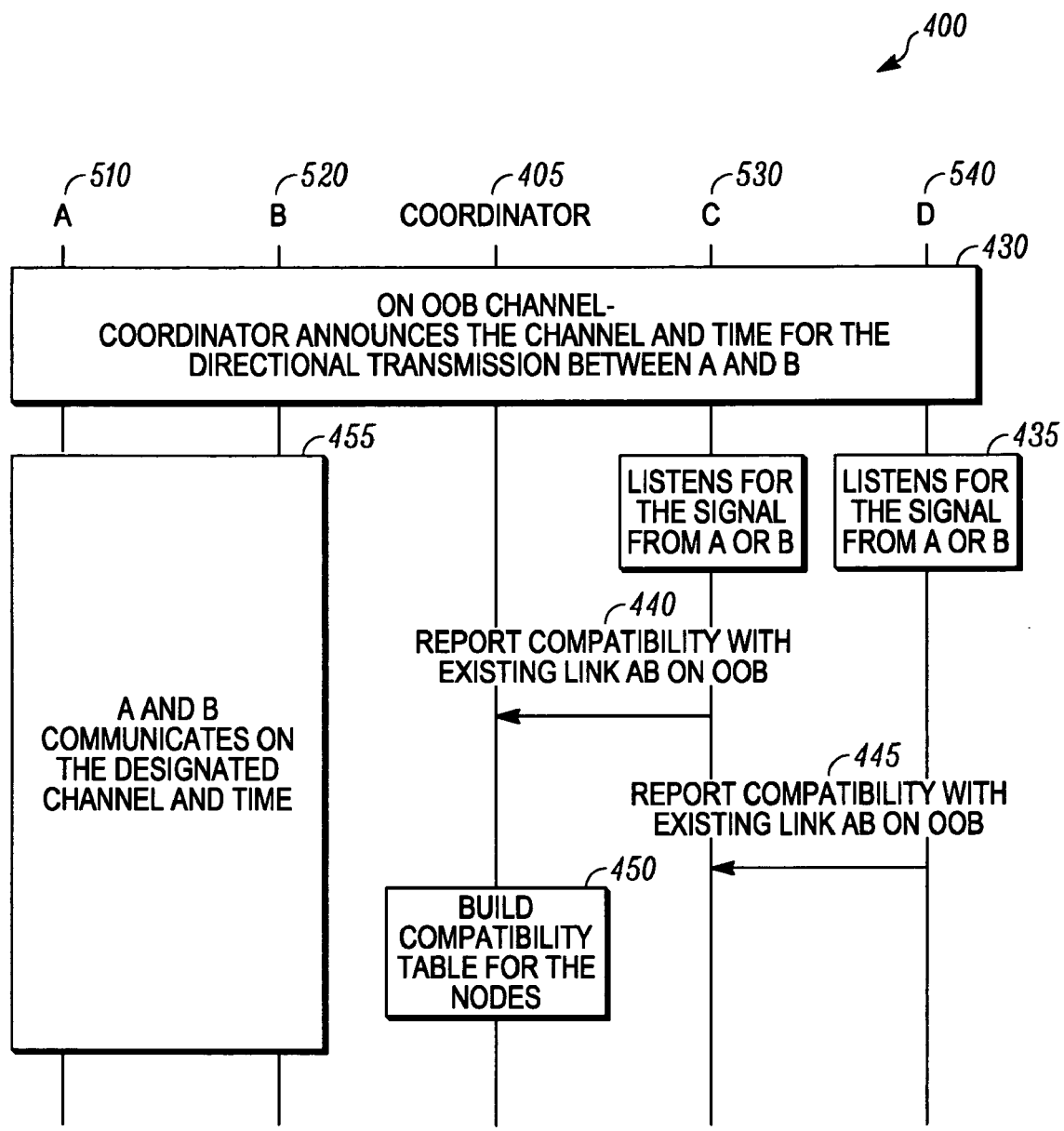
FIG. 4 depicts the message flow to evaluate the link compatibility in an embodiment of the present invention.
Figure 5:
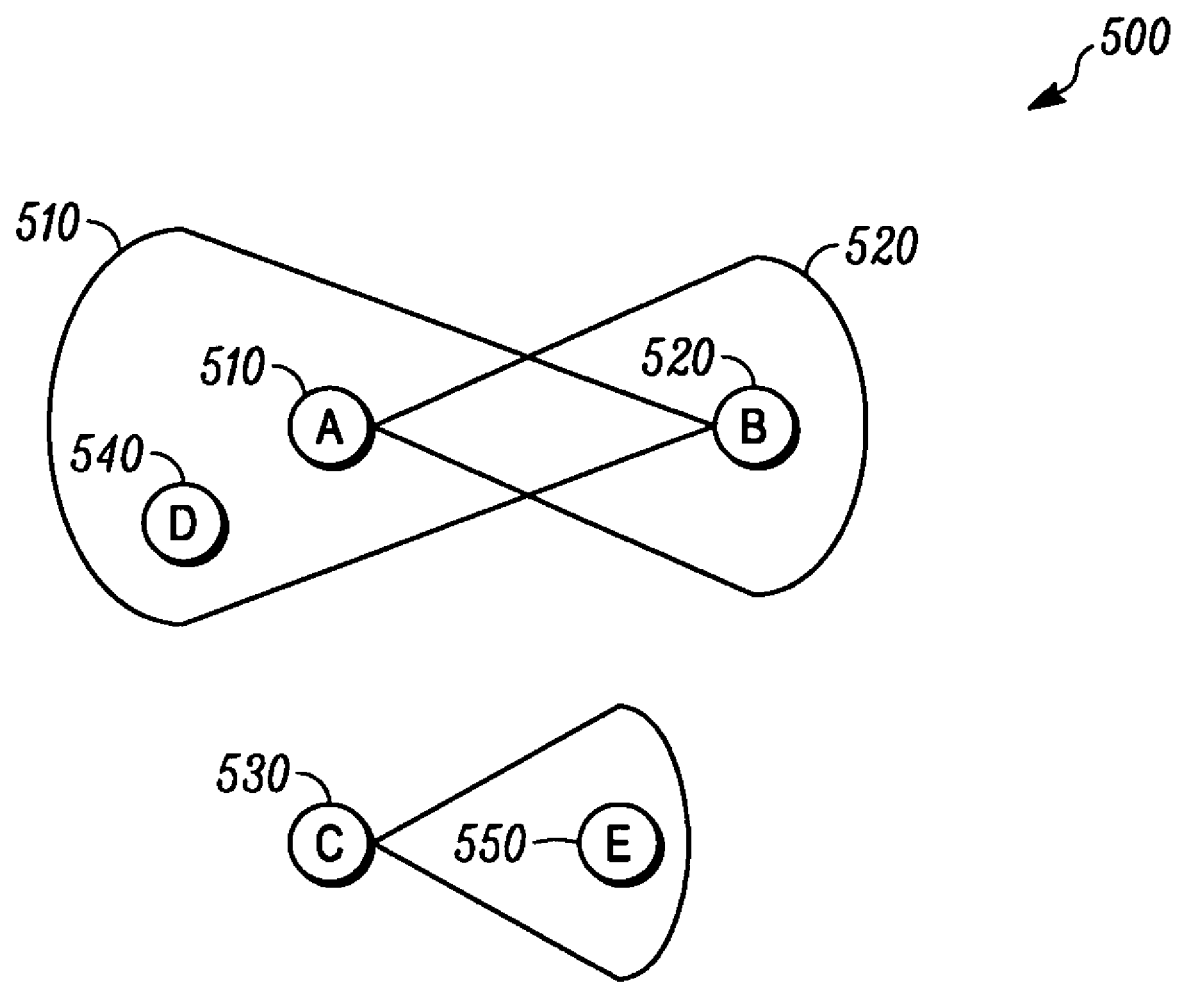
FIG. 5 illustrates a wireless personal area network (WPAN) topology in an embodiment of the present invention It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

Turning now to FIG. 4 at 400 is illustrated the message flow of the interference table calculation process, which is done with the aid of an out of band (OOB) control channel. FIG. 5 at 500 is used as an example of the WPAN topology with A, B, C, D, E shown as 510, 520, 530, 540 and 550 respectively. It is understood that the topology of FIG. 5 is but one example topology and the present invention is not limited to this topology. The first step is that the Coordinator 405 announces on the OOB control channel the time and the data channel used for the directional transmission of an existing link (e.g., bidirectional link A 510<->B 520) 430. For a distributed MAC, the transmitting devices will announce their directional transmissions individually. Then the rest of the devices (e.g., C 530, D 540 and E 550) will listen 435 for an amount of time sufficient to determine whether they can hear signal from either A 510 or B 520. If a device (e.g., C 530 and E 550) cannot hear the signal, that means it is not affected by the link under consideration (e.g. C 530 and E 550 are outside the beam-width of A 510 and B 520 and C 530->E 550 transmission will not interfere with that of A 410<->B 520). If a device can hear the signal, that means it is within the coverage area of the link under consideration (e.g. D 540 is inside the beam-width of B 520, thus D 540 will receive B's 520 transmission when the link A 510<->B 520 is active. As a consequence, if D 540 transmits, it will interferer B's 520 reception from A 510). Finally, the rest of the devices report their compatibility 440 and 445 with the link under consideration to the Coordinator 405 through the OOB channel. This information is used to build 450 a compatibility table set forth below. At 455, A 510 and B 520 communicate on the designated channel and time. For a distributed MAC, no reporting is needed and each node evaluates its own compatibility with the link under consideration.

TABLE 1

Links compatibility

|  | Compatible Devices (can receive when the link is active) | Incompatible Devices (cannot receive when the link is active) |
| --- | --- | --- |
| Old Link 1 (A<->B) | C and E | D |
| New Link 2 (C->E) | A, B and D | None |

For example, the communication between C 530 and E 550 may be granted concurrently with A 510<->B 520 if requested since they do not interfere with each other. Henceforth, the links A 510<->B 520 and C 530->E 550 belong to two different spatial reuse groups. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
a transceiver adapted for use in a wireless personal area network, wherein said transceiver is configured for spatial reuse using a virtual time division multiple access (TDMA) technique based on a directional transmission to a receiving device, wherein the spatial reuse allows additional non-interfering spatially-separate transceivers to perform concurrent communications without interfering with the directional transmission of said transceiver,
wherein all links associated with said transceiver and said additional transceivers are divided into a number of spatial reuse groups based on a message flow wherein:
under a centralized MAC, a Coordinator sends an announcement on a control channel including time and a data channel used for the directional transmission, or under a distributed MAC, said transceiver sends an announcement on the control channel including information regarding the directional transmission,
upon receiving the announcement, said additional transceivers each determine, for a predetermined amount of time, whether the directional transmission is receive thereby, and
each of said additional transceivers indicate, on the control channel, compatibility with the directional transmission, if that additional transceiver does not hear the directional transmission within the predetermined amount of time, otherwise indicate incompatibility with the directional transmission.

2. The apparatus of claim 1, wherein said links can be either unidirectional or bidirectional and data transmissions can be scheduled independently using TDMA on a plurality of virtual channels.

3. The apparatus of claim 1, wherein in order to maximize the number of parallel transmissions, one or more of said transceiver and said additional transceivers decrease the transmission power and/or change the beam-steering patterns and wherein the scheduling of channel time reservations in different groups is coordinated if a particular transceiver participates in multiple links falling into different groups so that this transceiver is not scheduled in more than one group at a time.

4. The apparatus of claim 1, wherein to divide the links into groups, the interference level caused by a transceiver at potential victim receivers is identified, and wherein said Coordinator under said centralized MAC, or each transceiver under a distributed MAC, constructs a compatibility table associated with the groups based on said indications of compatibility and incompatibility with the directional transmission, wherein the compatibility table indicates whether transmissions of a particular transceiver interferes with an existing link which links are able to transmit simultaneously, and is updated when a beam-steering pattern changes or transceivers move to a new location.

5. The apparatus of claim 1, wherein the control channel includes an out of band (OOB) control channel.

6. A method, comprising:
configuring a transceiver for spatial reuse using a virtual time division multiple access (TDMA) technique such that the transceiver sends a directional transmission to a receiving device in a wireless personal area network, wherein the spatial reuse allows additional non-interfering spatially-separate transceivers to perform concurrent communications without interfering with the directional transmission of said transceiver; and
defining a number of spatial reuse groups based on division of all links associated with said transceiver and said additional transceivers, said defining including:
under centralized MAC, sending, from a Coordinator, an announcement on a control channel including time and a data channel used for the directional transmission, or under a distributed MAC, sending, from said transceiver, an announcement on the control channel including information regarding the directional transmission,
upon receiving the announcement, determining, by each of said additional transceivers, for a predetermined amount of time, whether the directional transmission is received thereby, and
indicating on the control channel, by each of said additional transceivers, compatibility with the directional transmission, if that additional transceiver does not hear the directional transmission within the predetermined amount of time, otherwise indicating incompatibility with the directional transmission.

7. The method of claim 6, further comprising scheduling data transmissions independently using TDMA on a plurality of virtual channels and wherein said links can be either unidirectional or bidirectional.

8. The method of claim 6 wherein in order do maximize the number of parallel transmissions, one or more of said transceiver and said additional transceivers decrease the transmission power and/or change the beam-steering patterns and wherein the scheduling of channel time reservations in different groups is coordinated if a particular transceiver participates in multiple links falling into different groups so that this transceiver is not scheduled in more than one group at a time.

9. The method of claim 6, wherein to divide the links into groups, the interference level caused by a transceiver at potential victim receivers is identified, and wherein said Coordinator under said centralized MAC, or each transceiver under a distributed MAC, constructs a compatibility table associated with the groups based on said indications of compatibility and incompatibility with the directional transmission, wherein the compatibility table indicates whether transmissions of a particular transceiver interferes with an existing link and which links are able to transmit simultaneously, and is updated when a beam-steering pattern changes or transceivers move to a new location.

10. The method of claim 6, wherein the control channel includes an out of band (OOB) control channel.

11. An article comprising a non-transitory storage-medium having stored thereon instructions, that, when executed by a computing platform, results in:
configuring a transceiver for spatial reuse using a virtual time division multiple access (TDMA) technique such that the transceiver sends a directional transmission to a receiving device in a wireless personal area network, wherein the spatial reuse allows additional non-interfering spatially-separate transceivers to perform concurrent communications without interfering with the directional transmission of said transceiver; and
defining a number of spatial reuse groups based on division of all links associated with said transceiver and said additional transceivers, said defining including:
under a centralized MAC, sending, from a coordinator, an announcement on a control channel including time and a data channel used for the directional transmission, or under a distributed MAC, sending, from said transceiver, an announcement on the control channel including information regarding the directional transmission,
upon receiving the announcement, determining, by each of said additional transceivers, for a predetermined amount of time, weather the directional transmission is received thereby, and
indicating on the control channel, by each of said additional transceivers, compatibility with the directional transmission, if that additional transceiver does not hear the directional transmission within the predetermined amount of time, otherwise indicating incompatibility with the directional transmission.

12. The article of claim 11, comprising further instructions that when executed further comprise scheduling data transmissions independently using TDMA on a plurality of virtual channels and wherein said links can be either unidirectional or bidirectional.

13. The article of claim 11, wherein in order to maximize the number of parallel transmissions, one or more of said transceiver and said additional transceivers decrease the transmission power and/or change the beam-steering patterns and wherein the scheduling of channel time reservations in different groups is coordinated if a particular transceiver participates in multiple links falling into different groups so that this transceiver is not scheduled in more than one group at a time.

14. The article of claim 13, wherein to divide the links into groups, the interference level caused by a transceiver at potential victim receivers is identified, and wherein said Coordinator under said centralized MAC, or each transceiver under a distributed MAC, constructs a compatibility table associated with the you groups based on said indications of compatibility and incompatibility with the directional transmission wherein the compatibility table indicates whether transmissions of a particular transceiver interferes with an existing link and which links are able to transmit simultaneously and is updated when a beam-steering pattern changes or transceivers move to a new location.

15. The article of claim 11 wherein the control channel includes and out of band (OOB) control channel.

* * * * *